March 11, 1958 R. H. J. CARY 2,826,756

ANTENNAE

Filed Feb. 12, 1953 5 Sheets-Sheet 1

March 11, 1958

R. H. J. CARY 2,826,756

ANTENNAE

Filed Feb. 12, 1953

5 Sheets-Sheet 4

United States Patent Office 2,826,756

Patented Mar. 11, 1958

2,826,756

ANTENNAE

Rex Henry John Cary, Great Malvern, England, assignor to Minister of Supply in Her Majesty's Government of the United Kingdom of Great Britain and Northern Ireland, London, England Application February 12, 1953, Serial No. 336,611

Claims priority, application Great Britain February 14, 1952

19 Claims. (Cl. 343—708)

Figure 1:
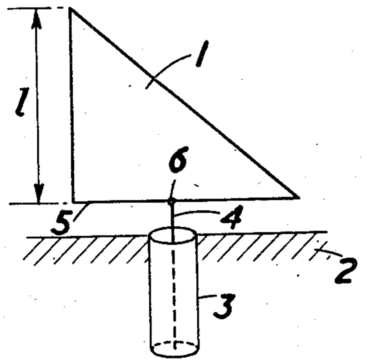

This invention relates to improvements in aerials and has particular, but not exclusive, reference to aerials of fin type for use in aircraft.

Aerials of the type with which this invention is concerned are those aerials in which the aerial, acting relative to an earth plane or earth counterpoise, has a certain distributed base capacity to earth which contributes little, if anything, to the radiating efficiency of the aerial and, in fact, acts as an undesired shunt across the aerial at its feed point. The deleterious effect of such a shunt capacity on the efficiency of a given aerial will tend to increase as the frequency rises and be at its worst in the highest frequency bands.

A typical example arises in the use in aircraft of fin aerials for frequencies in the range of 300 to 2,000 megacycles for example. A fin aerial normally comprises a fin projecting approximately a half or quarter wavelength outwardly from the surface of an aircraft, fed between earth (i. e. the aircraft skin) and a point on it close to the earth. The base of the fin is usually wide in a direction transverse to the fin height so that the aerial will possess a wide band characteristic. This width itself increases the base capacity of the aerial to earth and hence the wider the bandwidth attempted the greater is the unwanted capacitive shunt across the aerial feed.

Attempts to reduce the base capacity of such an aerial generally involve the tapering of the aerial towards the base; this reduces the strength of the aerial mounting and in the case of high-speed aircraft fin aerials, for example, necessitates the provision of a faired clamping casing over the fin.

It would be of advantage if the wide band fin aerial could be arranged so that the deleterious effect of the base capacity is obviated and also, at the same time, the advantages of wide bandwidth and mechanical strength maintained.

In general similar considerations will apply to any aerial radiator system having a base capacity to earth and fed across its base. Mechanical or other considerations may preclude any substantial reduction of the base area from which the base capacity is derived and it will then still be desirable to remove as far as possible the shunting effect of the base capacity across the base feed point.

It is accordingly an object of this invention to provide an aerial in which the shunting effect of its base capacity across its base feed is reduced to a large extent.

Other objects of the invention are the provision of such aerials in which different polar diagrams are possible and which can be made of such mechanical strength that they are suitable for mounting on the aerodynamic surfaces of high-speed aircraft.

According to the invention a base-fed aerial having a base capacity relative to an earth plane (or equivalent counterpoise) is arranged so that the base capacity, together with parts of the earth plane and with those parts of the aerial contributing to the base capacity, forms part of a resonant transmission line which looked into from the base-feed point of the aerial possesses a high impedance relative to the input impedance of the aerial.

Conveniently in an aerial having a base extending adjacent the earth plane the space between the earth plane and the base of the aerial contains dielectric material arranged so that there is formed by the base of the aerial and the earth plane a resonant transmission line which, when looked into at the base feed point, has a high impedance. A quarter wavelength resonant line for example may be formed by earthing a part or parts of the aerial base at an appropirate point or points remote from the base feed point.

The radiator of a base-fed aerial may comprise a fin having a base adjacent to but spaced from the earth plane and whose feed point is at a midpoint of its base. The ends of the base are connected to the earth plane and the dielectric filling of the space between the base and earth plane is arranged so that the base and the earth plane form a pair of resonant transmission lines extending in each direction along the base from the base feed point and short circuited at their outer ends whereby they have a high impedance within the operative waveband when looked into at the feed point.

According to the invention in another aspect a fin aerial for use on aircraft having a conducting skin comprises a base-fed fin connected only at each end of its base to the conducting skin of the aircraft acting as an earth plane, dielectric material being inserted in the space formed between the base of the fin and the conducting skin so that the base of the fin each side of the base-feed and the corresponding parts of the conducting skin adjacent the base of the fin form transmission lines short-circuited at their ends distant from the base-feed point, and resonant at the mid-band frequency of the fin, whereby the base capacity of the fin forms part of two resonant transmission lines having a high impedance across the feed of the fin.

For use as a fin aerial on a high-speed aircraft a fin is securely fastened in the aircraft skin at each end of its base and fed at a point between the ends. The base is separated from the earthed body of the aircraft along its length by the body of the aircraft being slotted or depressed, the slot or depression being filled with dielectric material to give the high impedance resonant transmission line characteristic and to provide at the base of the fin faired contours having good aerodynamic qualities.

By changing the position along the base of the base-feed point and by adjustment of the slot or depression relative to the length of the base the aerial may be made to have different polar diagrams in a plane parallel to the earth plane.

A twin-lobe aerial may be obtained by feeding two in-line fins in different phases and extending and joining each fin to the other so that in effect one fin exists above the earth plane. Variation of the feed phases provides adjustment of the two-lobes.

Figure 1A:
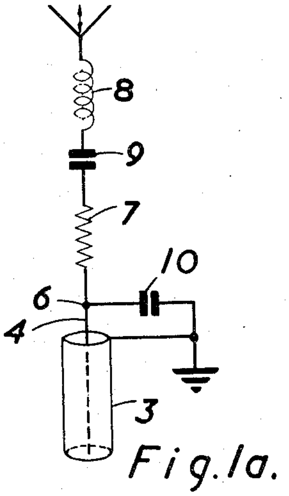
Figure 2:
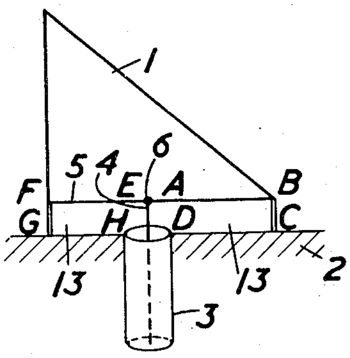
Figure 2A:
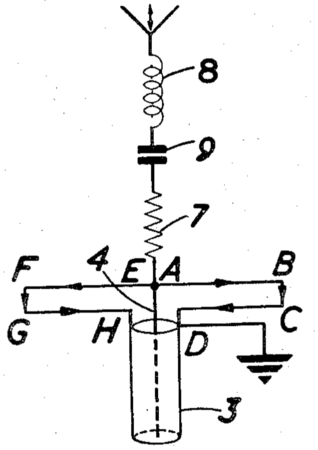
Figure 3:
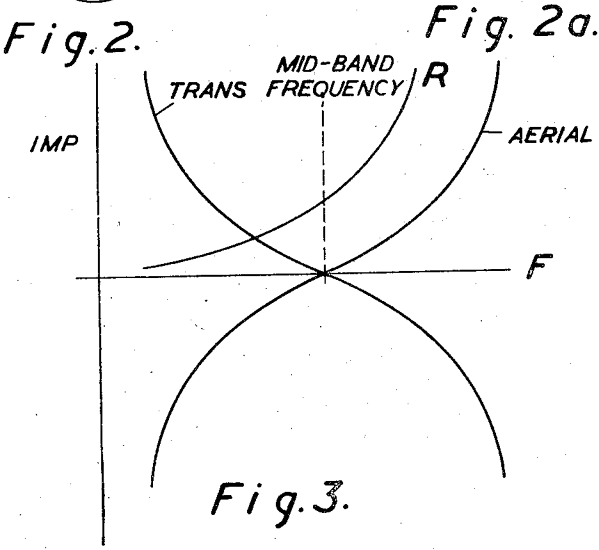
Figure 7:
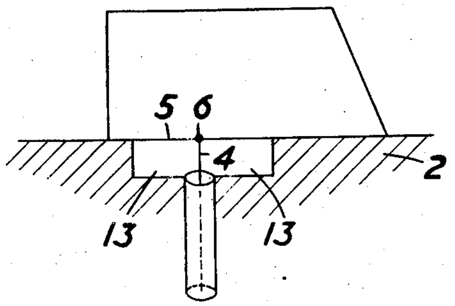
Figure 8:
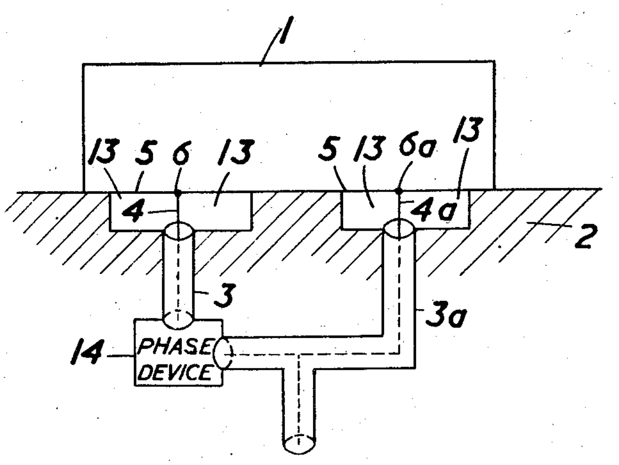
Figure 8A:
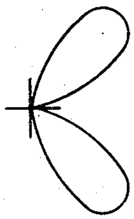
Figure 9:
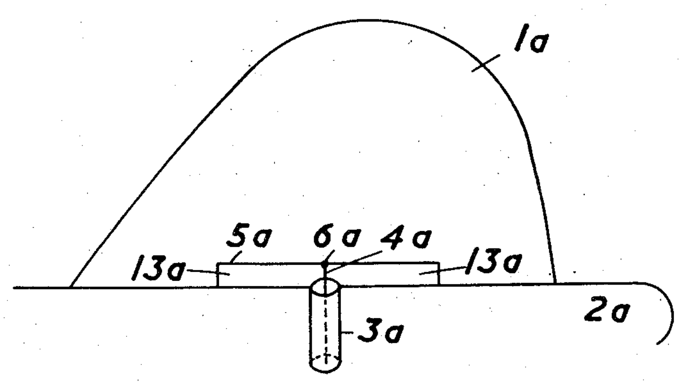
Figure 10:
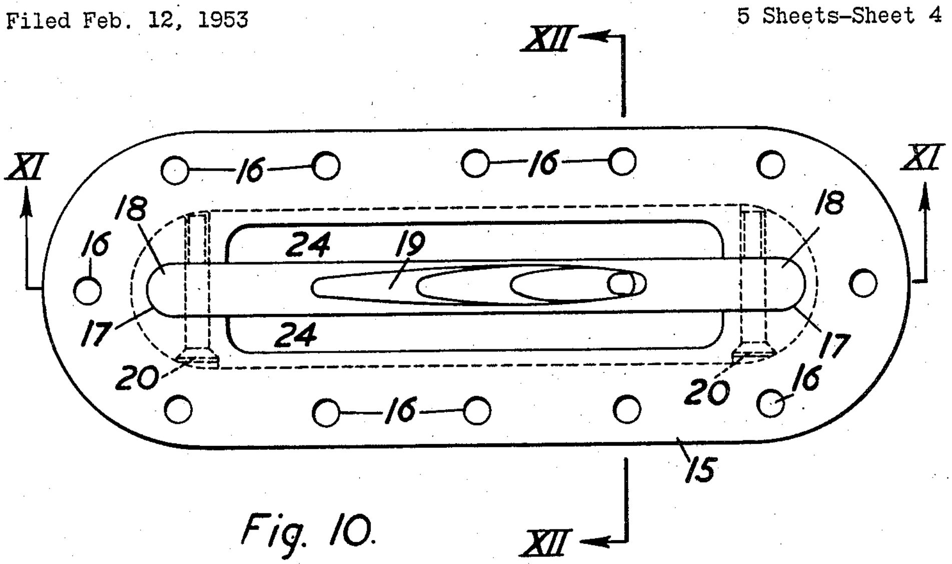
Figures 11, 12:
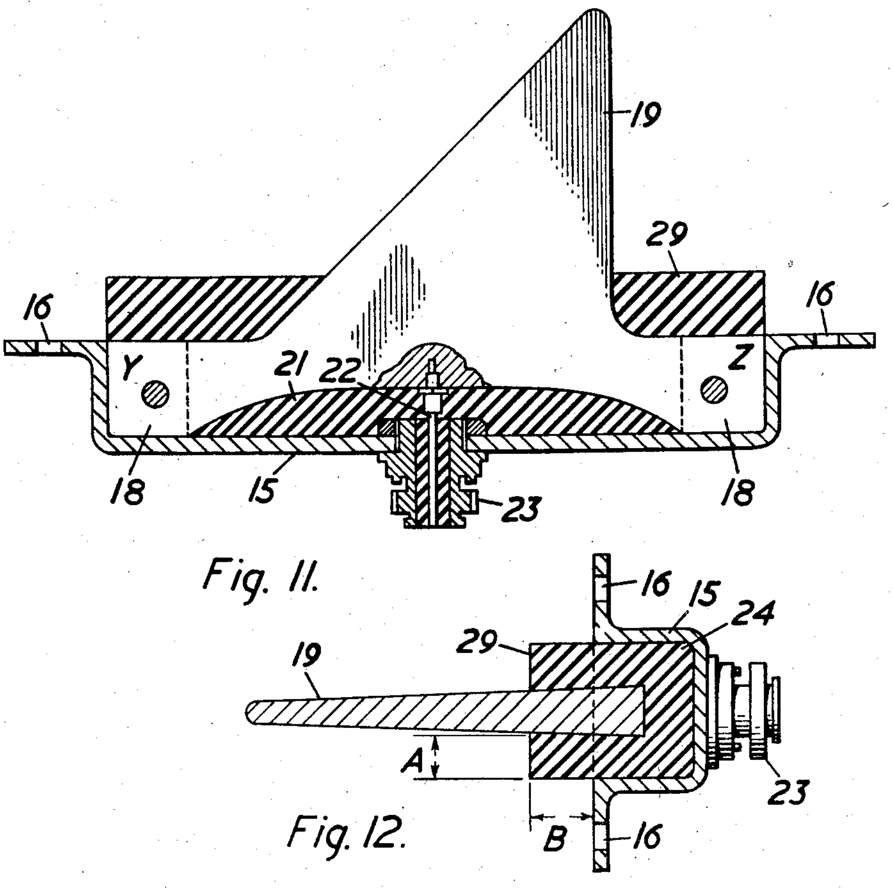

The invention and exemplary embodiments thereof will now be described with reference to the accompanying drawings in which:

Fig. 1 shows diagrammatically a simple wideband aerial,

Fig. 1*a* shows an equivalent circuit for the aerial of Fig. 1,

Fig. 2 shows diagrammatically a simple wideband aerial modified according to the invention, Fig. 2*a* shows an equivalent circuit of the modified aerial, Fig. 3 shows impedance curves of a particular type of modified aerial, Figs. 4–8 show diagrammatically different arrangements of an aerial according to the invention, Figs. 4a–8a show the different polar diagrams obtainable from the arrangements of Figs. 4–8 respectively, Fig. 9 shows diagrammatically an application of the invention to form an aerial from the tail-fin of the aircraft, Figs. 10–12 show the mechanical arrangement, in plan, part vertical section and in section across I—I, respectively, of a fin aerial according to the invention for high-speed aircraft, and Figs. 13–16 show certain modifications of the fin aerial.

In Fig. 1 a known type of base-fed wideband aerial is formed by a triangular sheet 1 suspended perpendicularly in the plane of the paper above an earth plane 2. A coaxial feeder 3 is connected at its internal conductor 4 to the base 5 of the aerial 1 at the point 6. The outer conductor of the coaxial feeder 3 is connected to the earth plane 2.

The mid-band frequency of the aerial 1 is determined by the length $l$. For the purposes of discussion the case of $l=\lambda/4$ will be taken but the invention is not limited to the $\lambda/4$ dimension of course.

Wide bandwidth is achieved in known manner by making the width of the aerial large. The tapering off from the base 5 to the top of the aerial 1 is incidental to the discussion at this stage but, in fact, indicates the fairing which would be applied to a fin aerial for use in an aircraft.

Fig. 1a shows an equivalent circuit of the aerial of Fig. 1. The resistance 7, inductance 8, and capacitance 9 of the aerial 1 are in series and are shunted at the feedpoint 6 by a capacitor 10. The capacitor 10 represents the distributed capacitance to earth of the aerial base 5 and is effectively an undesired shunt across the aerial 1 becoming more deleterious to aerial efficiency as the frequency increases.

The capacitor 10 will be greater the wider the bandwidth of the aerial 1 owing to the increase in the distributed capacitance of the base 5 as the bandwidth of the aerial 1 is increased by increasing its width.

Moreover, for the case where $l=\lambda/2$, the shunting effect of the capacitor 10 will be even more deleterious owing to the higher impedance of the $\lambda/2$ aerial arrangement.

In Fig. 2 an arrangement of the aerial 1 is shown which seeks to nullify the effect of the shunt capacitor 10. The ends B and F of the base 5 of aerial 1 are connected to the earth plane 2 by connections BC and FG respectively and the space 13 contains dielectric material arranged so that the transmission lines formed by the paths ABCD and EFGH are quarter-wavelength resonant lines at the mid-band frequency of the aerial 1. Because the connections BC and FG are short-circuits across the ends of lines ABCD and EFGH respectively the impedances of these lines across the points AD and EH will be high and the shunting effect low.

Fig. 2a shows the equivalent circuit of the arrangement of Fig. 2; the circulating currents in the lines ABCD and EFGH are indicated by arrow heads. It will be appreciated that the capacitor 10 shown in Fig. 1a now forms part of the resonant transmission lines ABCD and EFGH and owing to their high impedance across the base feed point 6 to the aerial 1 there is now no deleterious shunting effect across the aerial 1 due to the distributed capacitance of the base 5.

In general the arrangement of Fig. 2 can be made effective whatever the dimension $l$ of the aerial 1 but for the quarter-wavelength case a particular advantage arises in that there is reactance compensation between the transmission lines ABCD, EFGH and aerial 1 over a large part of the aerial bandwidth.

In Fig. 3 impedance (reactive or resistive) frequency curves are drawn as follows: R is the resistance characteristic of the aerial, AERIAL the base-fed reactance characteristic of the aerial 1 and TRANS the reactance shunt characteristic of the resonant transmission lines. The transmission line and aerial reactances are seen to compensate mutually over a frequency band which extends each side of the mid-band frequency.

Figure 4:
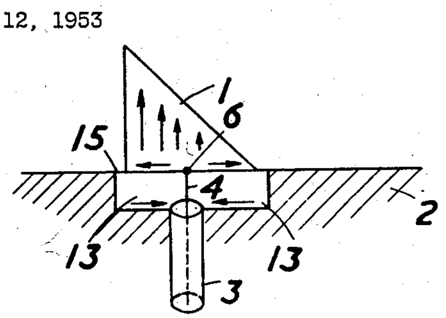
Figure 4A:
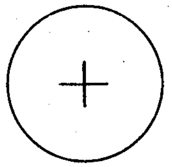

Referring again to the more general arrangement, Fig. 4 shows diagrammatically a base-fed fin aerial 1 fixed in the conducting body 2 of an aircraft (not shown). A slot or depression 13 is formed in the body 2 between the boundaries of which and the base 5 of the fin aerial 1 are formed the resonant transmission lines by the insertion of dielectric material in the space 13. The arrows show typical current circulations for this aerial. Fig. 4a shows the polar diagram for the aerial in a plane at right angles to the fin aerial 1.

Figure 5:
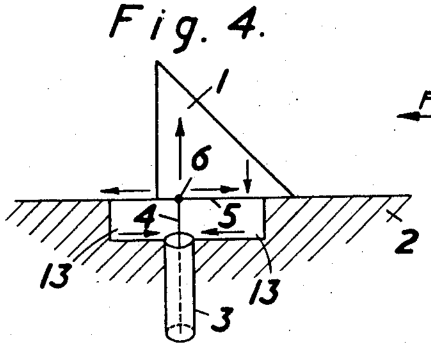
Figure 5A:
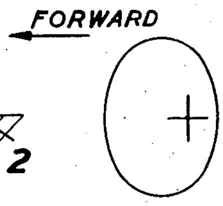

In Fig. 5 is shown a similar arrangement to that of Fig. 4 which gives a forward-looking polar diagram as shown in Fig. 5a. The fin aerial 1 of Fig. 5 derives this directional property from the placing of the fin aerial 1 to the one end of the space 13 so that the feed point 6 is towards the left-hand end, as shown, of the fin aerial 1. Typical current circulations are shown by the arrows.

Figure 6:
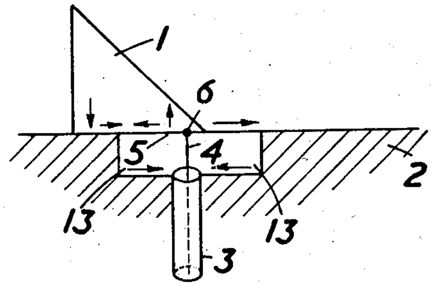
Figure 6A:
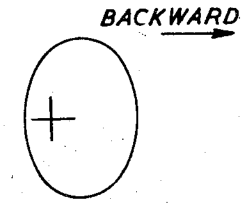

In Fig. 6 an aerial giving a backward-looking polar diagram is shown. This particular directional property is obtained by placing the fin aerial 1 to the forward end of space 13 so that the feed point 6 is towards the right-hand end, as shown, of the fin aerial 1. Typical current circulations are shown by the arrows.

Figure 7A:
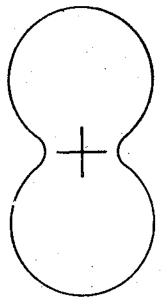

Fig. 7 illustrates how, by extending the fin aerial 1 beyond each end of the space 13 and using a more rectangular fin than previously, a sideways-looking polar diagram is obtained. This is shown in Fig. 7a.

Yet another arrangement, giving a twin-lobe polar diagram, is shown in Fig. 8, in which the fin aerial 1 is fed at two points 6 and 6a, one feed being subjected to a change of phase by a phase device 14. Separate slots or depressions 13 are formed at each feed and are arranged to determine resonant transmission lines as in the previous examples. The phase device 14 may be of any suitable type. The type of polar diagram obtained is illustrated in Fig. 8a. The orientation of the twin-lobes is determined by adjustment of the phase device 14.

In addition to its application for a fin aerial for an aircraft the invention may be applied as illustrated in Fig. 9 to provide a radiating tail-fin aerial for an aircraft. The fin 1A is fed at the point 6A by connection thereto of the inner conductor 4A of a coaxial feeder 3A. The outer conductor of the feeder 4A is connected to the aircraft body 2A which functions as an earth plane. A slot 13A cut out of the base of the tail-fin 1A contains dielectric material arranged as described for the aerials above to give the resonant transmission lines each side of the feed point 6A.

In Figs. 10, 11, and 12 is shown the physical arrangement of one example of an aerial according to the invention as applied to aerials for very high speed aircraft. The aerial in this example may be used within the band 300–2500 mc./s. and can cover a bandwidth having a maximum-to-minimum frequency ratio of 2:1. It is applicable for use with nearsonic and supersonic aircraft.

A flanged dish member 15 is let into the surface of an aircraft (not shown) and is secured by means of fastening bolts in the holes 16. The member 15, in the form of a dish has slots 17 at each end into which the ends 18 of a fin aerial 19 are fitted. Screws 20 secure the ends 18 in the slots 17. The base of the fin 19 is relieved to provide a space 21 and at the apex of the space 21 a conductor 22 of a coaxial terminal 23 is connected.

The fin 19 is nominally a quarter wavelength high at the aerial mid-band frequency and the space 21 contains dielectric arranged to produce quarter wave transmission lines sideways from the base feed point 21 at the mid-band frequency. Allowance is made at the same time for the dielectric required to fair-off the spaces 24.

Because the flange of the dish member 15 will mate with the inside surface of an aircraft in which it is fixed, dielectric filling 29 in the spaces 21 and 24 is arranged to protrude above the surface of the member 15 as indicated in Figs. 11 and 12 of the drawing.

Although the actual dimensions of a given aerial and the dielectric filling will vary according to the mid-band frequency and the bandwidth desired in particular it is possible to indicate the general dimensions to be expected in typical cases.

Figures 13, 14:
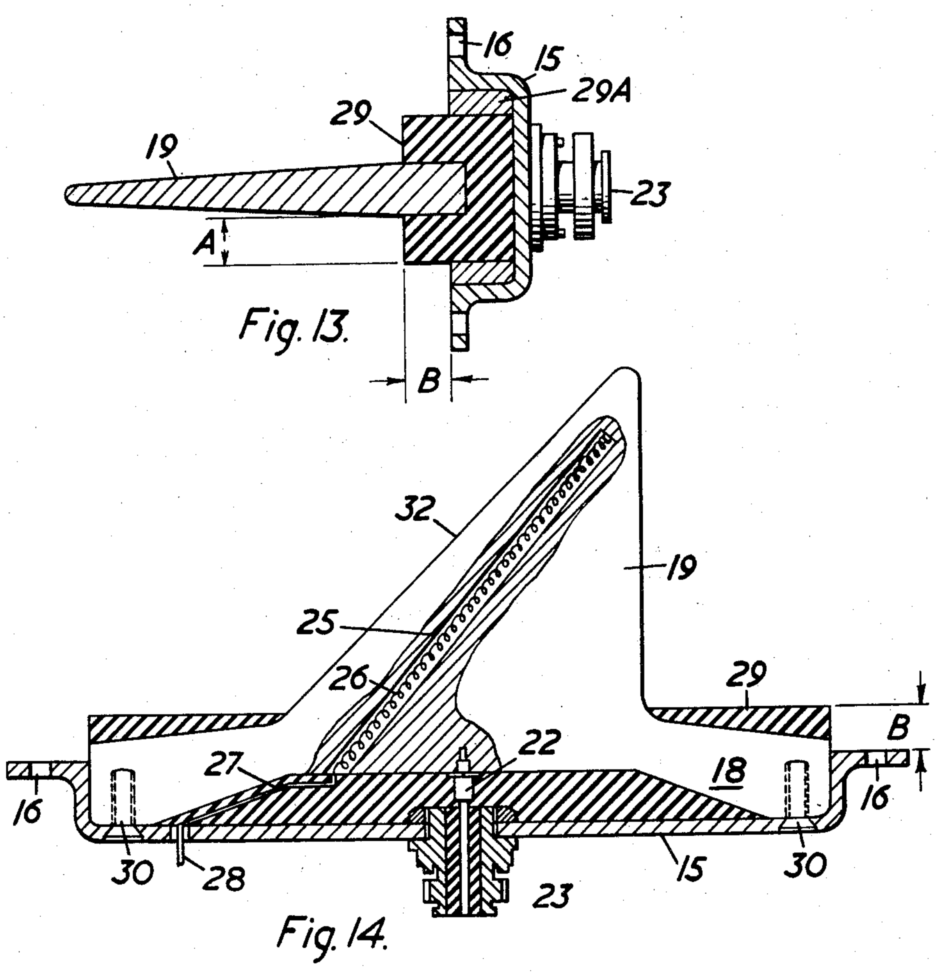

For instance in the aerial of Figs. 10, 11 and 12 when used for a mid-band frequency of 1,000 mc./s. the dielectric filling can be polythene, the height of the fin 19 above the flange surface of the order of 3 inches and the length of the base between the centres of securing screws 20 about 4½ inches. The dimension A depends upon the dielectric material used and for the particular aerial being considered is of the order of half an inch. Should the dish member 15 be of a standard size and be required to be used for different aerial fins and dielectrics the dimension A is modified accordingly. The arrangement of Fig. 13 illustrates this. Here polytetrafluorethylene (P. T. F. E.) has been used for the filling 29 and the space then remaining at each side of the filling 29 is filled by metal spacers 29A. P. T. F. E. has the advantage of combining good electrical properties with good resistance to heat and is of value when designing an aerial which is in the path of a jet engine exhaust for example. The dimension B depends upon the aircraft skin and may be of the order of ⅜"–½". Where the aircraft skin is curved suitably conducting packing pieces may be placed on the flange surfaces of the dish member 15. The dielectric material 29 is also shaped on its surface to conform to the aircraft contour.

Arrangements are simply made to provide de-icing of the aerials. In Fig. 14 an aerial fin 19 has a long, relatively fine hole 25 drilled in it parallel to and adjacent to its leading edge 32. A heating element 26 is provided in the hole 25 and is brought out to a terminal connection 28 by means of leads 27. The leads 27 are conveniently led close to the base of the fin 19. In use terminal connection 28 is connected to a suitable point of the aircraft power supply.

Fig. 14 also shows an alternative fixing for the fin 19 in the member 15. Screws 30 pass through the base of the member 15 and hold the fin 19 securely in the member 15.

Figure 15:
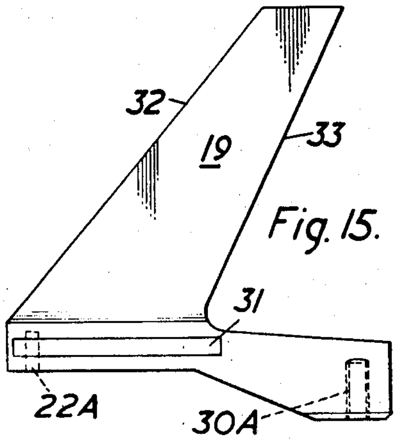
Figure 16:
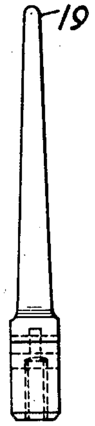

A modified form of fin 19 is shown in Figs. 15 and 16, which are side and end elevations respectively. In use the modified fin 19 replaces the fin 19 of Fig. 14 the right-hand screw 30 (as seen in Fig. 14) being secured in a hole 30A and the connector 23 being connected at a hole 22A. It will be appreciated that the fin is confined to the right-hand half of the dish member 15 and the trailing edge 33 is cut-away to some extent. This modified form of fin is of particular value where a uniform all-round looking aerial is required. Because there is no fastening corresponding to the left-hand screw 30 of Fig. 14 a slot 31 is provided longitudinally each side of the base of the fin. The dielectric material readily moulds into these slots and serves to locate the fin 19.

It will be easily appreciated that for high speed aircraft such aerials have the advantage of giving a very robust base fixing which is difficult to achieve where other methods of reducing the effects of base capacitance have been used; for instance, in the case where reduction of the base capacitance has been achieved by reducing the width of the fin aerial adjacent to the earth plane, thereby necessitating the provision of additional supports such as faired plastic hoods. Such hoods are not entirely satisfactory where a wide range of temperature, say −70° C. to +95° C. may be encountered. In the example of Figs. 10–12 it would be possible, if need be, to strengthen the base of the fin 19 still further by putting a strip member, for example, adjacent the side of the base of the fin 19 and extending between points Y and Z (Fig. 11), the slots 18 being enlarged if necessary. Alternatively such a strip member may form part of the aircraft structure, e. g. a spar or stringer conveniently placed.

It will be noted also that the opening in the skin of the aircraft for this type of aerial is effectively only two narrow slots each side of the fin and hence the weakening effect on the aircraft structure is reduced.

Although the particular examples described above have been based on incorporating the base capacity into resonant quarter wavelength transmission lines it will be apparent that it is possible to make use of resonant half-wavelength transmission lines. Aerials having half-wavelength transmission lines would not, of course, be so robust and simply fixed as the type having quarter wavelength transmission lines owing to the absence of the earthed end connections of the base which give such good fixing, but such aerials would still possess the advantage of reduced unwanted shunting due to the base capacitance.

The invention is not limited to the use of dielectric material for producing the appropriate resonant transmission lines and any suitable method may be adopted such as the insertion of inductance coils in the paths of the transmission line circulating currents or the adjustment of inductance of the transmission line paths by the use of magnetic materials suitably positioned.

Moreover the invention may be applied to other forms of aerial than the fin described. The electrical equivalent of a fin may be easily adopted into the arrangement and may have other advantages. For example, where it is desired to reduce resistance to wind blowing broadside on a mesh or array of wires may be used.

Although the aerial of the invention has been described for wideband use within the frequency band 300–2,500 mc./s. it will be apparent to those skilled in the art that the invention may be applied for use at other frequencies without going outside the scope of the invention.

I claim:

1. An aerial comprising a radiation element cooperating with a counterpoise earth and having a body part and a base, the ends of said base being connected to the counterpoise earth to form a short-circuited quarter wavelength transmission line, the body part being distributed over the base, the base thereby providing a distributed feed for the body part whereby the element together with cooperating parts of the counterpoise earth determines a distributed base capacity relative to earth and a distributed radiation impedance fed from the base, a feeder connected between base and earth and adapted to feed the radiation element, and dielectric means for tuning said capacity to present an impedance at the desired operating frequency of the aerial across the feeder connection at the base which is high relative to the input impedance of the aerial.

2. A base fed aerial having a distributed base capacity relative to a counterpoise earth and a distributed radiation impedance fed from the base, parts of the aerial base and parts of the counterpoise earth cooperating to form said base capacity, and dielectric material located between the base and the counterpoise earth to tune said capacity whereby said parts of the aerial base and the counterpoise earth form a resonant transmission line connected across the base-feed having an impedance high relative to the input impedance of the aerial.

3. An aerial according to claim 1, wherein the tuning means comprises means adapted to modify the distributed base capacity from point to point along the base whereby the base and the cooperating parts of the counterpoise earth form a resonant transmission line system connected across the base feed connection.

4. An aerial according to claim 3, wherein the tuning means comprises a mass of dielectric material located in the field between the radiation element and the counterpoise earth.

5. An aerial according to claim 3, wherein the tuning means comprises a mass of dielectric material located in the field between the radiation element and the counterpoise earth, and connecting means adapted to connect the base and the counterpoise earth at a point separated from the base feed such that the dielectric material, the cooperating parts of the aerial base and the counterpoise earth form a short-circuited quarter wavelength transmission line system connected across the base feed and resonant at the desired operating frequency of the aerial.

6. An aerial according to claim 5, wherein the radiation element comprises a resonant quarter-wavelength member.

7. An aerial for an aircraft having a conductive skin comprising a fin-shaped radiation element having a radiating portion and a base, a conductive longitudinal dish member adapted to be fitted into the aerodynamic outline of the aircraft and forming with the aircraft skin a counterpoise earth for the aerial, the base of the fin element extending longitudinally across the opening of the dish member and being fastened only at its extremities to the ends of the dish member, a feeder connecting through the dish member across the base of the fin at an intermediate point along the base and the counterpoise earth, and a mass of dielectric material contained in the dish member and faired to preserve the aerodynamic outline of the aircraft in the immediate vicinity of the fin, the dielectric material being so chosen and positioned that the base of the fin, the base extremity and cooperating parts of the counterpoise earth form a pair of short-circuited quarter wavelength resonant transmission lines connected in parallel across the aerial feeder.

8. An aerial according to claim 7, wherein the fin radiation element comprises a resonant quarter-wavelength member.

9. An aerial according to claim 8 wherein the radiation element comprises a triangular fin the base of the triangle being the base of the aerial and the height of the triangle being of electrical length equal to a quarter wavelength.

10. An aerial according to claim 8, wherein the radiating portion is longitudinally offset relative to the base whereby one extremity overlaps the counterpoise earth beyond one extremity of the base, the feeder connection at the base being nearer one extremity of the radiation element than the other and the overlapping part of the radiating portion being conductively connected to the counterpoise earth along the overlap.

11. An aerial according to claim 8, wherein the radiation element comprises a radiating portion extending longitudinally beyond one end of the dish member and conductively connected to the counterpoise earth along such extension.

12. An aerial according to claim 11, comprising a further base of the radiation element in the longitudinally extended portion, a second dish member adapted to be fitted into the aerodynamic outline of the aircraft for holding the further base at its extremities, a second feeder, a phase-advancing means connected in series with the second feeder, the second feeder being connected to feed the further base through the second dish member, and to be fed in parallel with the first feeder, and a mass of dielectric material contained in the second dish member and faired to preserve the aerodynamic outline of the aircraft in the immediate vicinity of the fin extension, the dielectric material being so chosen and positioned that the further base, the extremities of the further base and cooperating parts of the counterpoise earth form a pair of short-circuited quarter wavelength resonant transmission lines connected in parallel across the second feeder.

13. An aerial for an aircraft having a conductive skin comprising a fin-shaped radiation element having a radiating portion and a base, a conductive longitudinal dish member adapted to be fitted into the aerodynamic outline of the aircraft and forming with the aircraft skin a counterpoise earth, the base of the fin element extending longitudinally in the opening of the dish-member and conductively fastened only at one extremity to one end of the dish member, a feeder connected through the dish member across the other extremity of the base of the fin and the counterpoise earth, and a mass of dielectric material contained in the dish member and faired to preserve the aerodynamic outline of the aircraft, the dielectric material being so chosen and positioned that the base of the fin, the base extremity and cooperating parts of the counterpoise earth form a short-circuited quarter wavelength resonant transmission line connected in parallel across the aerial feeder.

14. An aerial according to claim 13, wherein the base of the fin element defines re-entrant angles adapted to hold part of the dielectric material to assist in anchoring the fin element.

15. An aerial comprising a tail fin of an aircraft having a conducting skin, a portion of the body of the aircraft adjacent the base of the tail fin, the aircraft skin adjacent the juncture of the tail fin and body portion defining a slot transversely of the tail fin and longitudinally of the aircraft, a feeder connected for feeding between the aircraft skin and a mid-point of the base of the tail fin in the slot, and a mass of dielectric material contained in the slot and faired to preserve the aerodynamic outline of the aircraft, the dielectric material being so chosen and positioned that the skin of the aircraft surrounding the slot and the dielectric together define a pair of short-circuited quarter wavelength resonant transmission lines connected in parallel across the aerial feeder.

16. An aerial for an aircraft having a conductive skin comprising a fin shaped radiation element having a radiating portion and a base, the base forming part of the structure of the aircraft such that the fin element projects above the aerodynamic outline of the aircraft, a portion of the skin of the aircraft adjacent the projecting fin, said portion defining two slots each parallel to the base of the fin element and on a different side thereof, means for providing a conductively walled cavity behind the two slots conductively connected to the aircraft skin forming with the aircraft skin a counterpoise earth connected to the base only at the extremities thereof, a feeder for feeding the aerial across the aircraft skin and an intermediate point of the base of the fin-element, and a mass of dielectric material contained in the cavity and faired to preserve the aerodynamic outline of the aircraft in the immediate vicinity of the fin, the dielectric material being so chosen and positioned that the base of the fin, the base extremities and cooperating parts of the counterpoise earth form a pair of short-circuited quarter-wavelength resonant transmission lines connected in parallel across the aerial feed.

17. An aerial according to claim 16, wherein the fin radiation element comprises a resonant quarter-wavelength member.

18. An aerial according to claim 16, wherein the radiation element comprises a triangular fin the base of the triangle being the base of the aerial and the height of the triangle being of electrical length equal to a quarter wavelength.

19. An aerial according to claim 17, wherein the radiating portion is longitudinally offset relative to the base whereby one extremity overlaps the counterpoise earth beyond one extremity of the base, the feeder connection at the base being nearer one extremity of the radiation element than the other and the overlapping part of the radiating portion being conductively connected to the counterpoise earth along the overlap.

References Cited in the file of this patent

UNITED STATES PATENTS

| | | |
|---|---|---|
| 2,354,314 | Harsted | July 25, 1944 |
| 2,432,057 | Wheeler | Dec. 2, 1947 |
| 2,612,606 | Wehner | Sept. 30, 1952 |